US008380000B2

(12) United States Patent
Lee et al.

(10) Patent No.: US 8,380,000 B2
(45) Date of Patent: Feb. 19, 2013

(54) METHODS OF DEBLURRING IMAGE AND RECORDING MEDIUMS HAVING THE SAME RECORDED THEREON

(75) Inventors: Seung-Yong Lee, Gyeongsangbuk-do (KR); Sung-Hyun Cho, Gyeongsangbuk-do (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 708 days.

(21) Appl. No.: 12/580,975

(22) Filed: Oct. 16, 2009

(65) Prior Publication Data

US 2010/0166332 A1 Jul. 1, 2010

(30) Foreign Application Priority Data

Dec. 31, 2008 (KR) .......................... 10-2008-138195

(51) Int. Cl.
*G06K 9/40* (2006.01)
(52) U.S. Cl. ....................................................... 382/255
(58) Field of Classification Search .................. 382/255, 382/254, 103, 284
See application file for complete search history.

(56) References Cited

U.S. PATENT DOCUMENTS

| 6,678,330 | B1 | 1/2004 | Kondo et al. | |
| 7,440,634 | B2 * | 10/2008 | Ben-Ezra et al. | ............. 382/255 |
| 2008/0137978 | A1 * | 6/2008 | Fu | ................................. 382/255 |

FOREIGN PATENT DOCUMENTS

| JP | 08-032839 A | 2/1996 |
| KR | 10-0688536 A | 9/2006 |
| WO | 2007/089668 A2 | 8/2007 |

OTHER PUBLICATIONS

International Preliminary Report on Patentability issued for PCT/KR2009/005825, dated Aug. 9, 2011 (5 pages).
Written Opinion issued for PCT/KR2009/005825, dated May 26, 2010 (4 pages).
Korea Intellectual Property Office Abstract Publication No. 1996-032839, dated Feb. 2, 1996 (1 page).
Korea Intellectual Property Office Abstract Publication No. 1020060098952, dated Sep. 19, 2006 (2 pages).
Yitzhaky, Y., Mor, I., Lantzman, A., Kopeika, N. S., "Direct Method for Restoration of Motion-Blurred Images", 1998 Optical Society of America, vol. 15, No. 6, Jun. 1998, 8 pages.
Rav-Acha, A., Peleg, S., "Two Motion-Blurred Images are Better than One", Elsevier, Jun. 24, 2004, 7 pages.
Yuan, L., Sun, J., Quan L., Shum, H., "Image Deblurring with Blurred/Noisy Image Pairs", ACM Transactions on Graphics, vol. 26, No. 3, Article 1, Jul. 2007, 10 pages.

(Continued)

*Primary Examiner* — Yon Couso
(74) *Attorney, Agent, or Firm* — Osha Liang LLP

(57) ABSTRACT

A method of deblurring an image by which blur can be easily and rapidly eliminated from one image and the quality of the image can be improved is provided. The method includes receiving a blurred image, an image estimation step of estimating a non-blurred image from the blurred image, a blur information estimation step of estimating blur information from the blurred image and the estimated non-blurred image, and a deblurring step of deblurring the blurred image based on the blurred image and the estimated blur information, wherein the image estimation step and the blur information estimation step are iteratively performed. Thus, blur can be rapidly and effectively eliminated from one image, thereby improving the quality of an image.

9 Claims, 9 Drawing Sheets

OTHER PUBLICATIONS

Money, J., Kang, S., "Total Variation Minimizing Blind Deconvolution with Shock Filter Reference", Elsevier, Mar. 21, 2006, 13 pages.

Fergus, R., Singh, B., Hertzmann, A., Roweis, S., Freeman, W., "Removing Camera Shake from a Single Photograph", ACM, Jan. 2006, 8 pages.

Jia, J., "Single Image Motion Deblurring Using Transparency", CVPR'07, Jun. 2007, 8 pages.

Shan, Q., Jia, J., Agawqala, A., "High-Quality Motion Deblurring from a Single Image", ACM Transactions on Graphics, vol. 27, No. 3, Article 73, Aug. 2008, 10 pages.

* cited by examiner

FIG. 9

| Image | Size | | Processing time (sec.) | | |
|---|---|---|---|---|---|
| | Image | Kernel | A | B | C |
| a | 972 X 966 | 65 X 93 | 2.188 | 3.546 | 5.766 |
| b | 1024 X 768 | 49 X 47 | 1.062 | 1.047 | 2.125 |
| c | 483 X 791 | 35 X 39 | 0.343 | 0.253 | 0.578 |
| d | 858 X 558 | 61 X 43 | 0.406 | 0.297 | 0.703 |
| e | 846 X 802 | 35 X 49 | 0.516 | 0.406 | 0.922 |

A : Time consumed to perform steps 120 to 140 in FIG. 1
B : Time consumed to perform step 150 in FIG. 1
C : Total performance time

METHODS OF DEBLURRING IMAGE AND RECORDING MEDIUMS HAVING THE SAME RECORDED THEREON

CROSS-REFERENCE TO RELATED APPLICATION

This application claims the benefit under 35 U.S.C. §119 (a) of Korean Patent Application No. 2008-138195, filed on Dec. 31, 2008, the disclosure of which is incorporated herein in its entirety by reference.

BACKGROUND

1. Field

The present invention relates to image processing methods, and more particularly, to methods of deblurring an image, and recording mediums having the same recorded thereon.

2. Description of the Related Art

A blur phenomenon may often occur in a process of acquiring an image using an image acquisition device and is a cause of degraded quality of an image.

In order to acquire an image using a device, such as a camera, in an environment including an insufficient amount of light, such as, inside a dark room or outside a room in the evening, a sufficient amount of light is necessary to obtain a strong image. For the sufficient amount of light, an image sensor must be exposed to light for a long time. The long exposure, however, causes an acquired image to be blurred due to a shaken image sensor.

Although elimination of a blur phenomenon has been studied a great deal, it is still difficult to eliminate blur from an image. This is because estimating and eliminating blur from an image require more new information than given information.

In order to resolve the problem, conventional solutions use several images, require additional information such as an exposure time of a sensor, or assume a limited shape of blur, such as a blur shape limited to a linear motion that can be represented by a two-dimensional vector.

Ytizhakey et al. (YTIZHZKEY, Y., MOR, I., A., and KOPEIKA, N. S., 1998, Direct Method For Restoration of Motion-blurred Images. Journal of Opt. Soc. Am. A. 15, 6, 1512-1519) estimates blur that can be represented using a 2D vector on the assumption that an image has isotropy. Rav-Acha and Peleg (RAV-ACHA, A. and PELEG, S., 2005, Two Motion-blurred Images Are Better Than One. Pattern Recognition Letters 26, 311-317.) proposed a method of estimating blur using two blurred images. Yuan et al. (YUAN, L., SUN, J., QUAN, L., and SHUM, H.-Y., 2007, Image Deblurring With Blurred/Noisy Image Pairs. ACM Trans. Graphics 26, 3, 1.) proposed a method of estimating and eliminating blur using a noisy non-blurred image and a blurred image.

Money and Kang (MONEY, J. H. and KANG, S. H., 2008, Total Variation Minimizing Blind Deconvolution with Shock Filter Reference. Image and Vision Computing 26, 2, 302-314.) proposed a method of estimating Gaussian blur and blur capable of being represented using a 2D vector, by applying shock filtering to a blurred image to restore sharp edges and then using the sharp edges.

In recent years, methods of estimating general blur rather than motion blur capable of being represented using a small number of parameters from one image and eliminating the general blur have been introduced. Fergus et al. (FERGUS, R., SINGH, B., HERTZMANN, A., ROWEIS, S. T., and FREEMAN, W., 2006, Removing Camera Shake From A Single Photograph. ACM Trans. Graphics 25, 787-794.) proposed a method of estimating blur using a statistical characteristic of a general image. Jia (JIA, J., 2007, Single Image Motion Deblurring Using Transparency. In Proc. CVPR 2007, 1-8.) proposed a method of finding information on a blur occurrence region in an image using an alpha matte scheme and then deblurring the image. However, in the method proposed by Fergus et al. an excellent result is difficult to derive and the method consumes much time due to a complex statistical model, and for the method proposed by Jia excellent matte must be obtained for a satisfactory result due to its high dependence on a result of the alpha matte scheme.

Shan et al. (SHAN, Q., JIA, J., and AGARWALA, A., 2008, High-Quality Motion Deblurring From A Single Image. ACM Trans. Graphics 27, 73.) proposed a method of estimating and eliminating blur by suggesting the statistical characteristic of the general image proposed by Fergus et al. in a form enabling easy calculation and using the statistical characteristic. However, the method is impractical because a processing time from a few minutes to about ten minutes or more is required to process one image.

SUMMARY

The present invention is directed to a method by which one image can be easily and rapidly deblurred and the quality of an image can be improved.

The present invention is also directed to a recording medium having a method recorded thereon by which one image can be easily and rapidly deblurred and the quality of an image can be improved.

In example embodiments, a method of deblurring an image includes: receiving a blurred image; an image estimation step of estimating a non-blurred image from the blurred image; a blur information estimation step of estimating blur information from the blurred image and the estimated non-blurred image; and a deblurring step of deblurring the blurred image based on the blurred image and the estimated blur information. Here, the image estimation step and the blur information estimation step are iteratively performed. The image estimation step may include: a gradient information prediction step of predicting gradient information for the blurred image; and a first deconvolution step of performing first deconvolution based on the estimated blur information and the blurred image. The gradient information prediction step may include: applying bidirectional filtering to the blurred image; applying shock filtering to the bidirectional filtered image; calculating a gradient map for the shock filtered image; and applying a threshold value to the calculated gradient map. Applying a threshold value to the calculated gradient map may include: creating a histogram based on a direction and a size of the calculated gradient; setting a size of a gradient capable of including as many pixels as a predetermined multiple or more of a maximum value of vertical and horizontal sizes of the blur information corresponding to each direction included in the created histogram, as a threshold value; and applying the set threshold value to the gradient map to truncate the gradient. Applying the set threshold value to the gradient map to truncate the gradient may include setting a gradient smaller than the threshold value to about zero. The blur information estimation step may include estimating the blur information based on the blurred image and the truncated gradient. The blur information estimation step may include estimating the blur information using an energy function including only image derivatives without a pixel value. The image estimation step and the blur information estimation step may be iteratively performed while changing resolutions of the blurred image and the estimated non-blurred image.

In example embodiments, a recording medium having a program of instructions recorded thereon is provided. The program performs: receiving a blurred image; an image estimation step of estimating a non-blurred image from the blurred image; a blur information estimation step of estimating blur information from the blurred image and the estimated non-blurred image; and a deblurring step of deblurring the blurred image based on the blurred image and the estimated blur information. Here, the image estimation step and the blur information estimation step are iteratively performed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

FIG. 9 illustrates a processing time for deblurring images shown in FIG. 8.

DETAILED DESCRIPTION OF EMBODIMENTS

Figure 1:
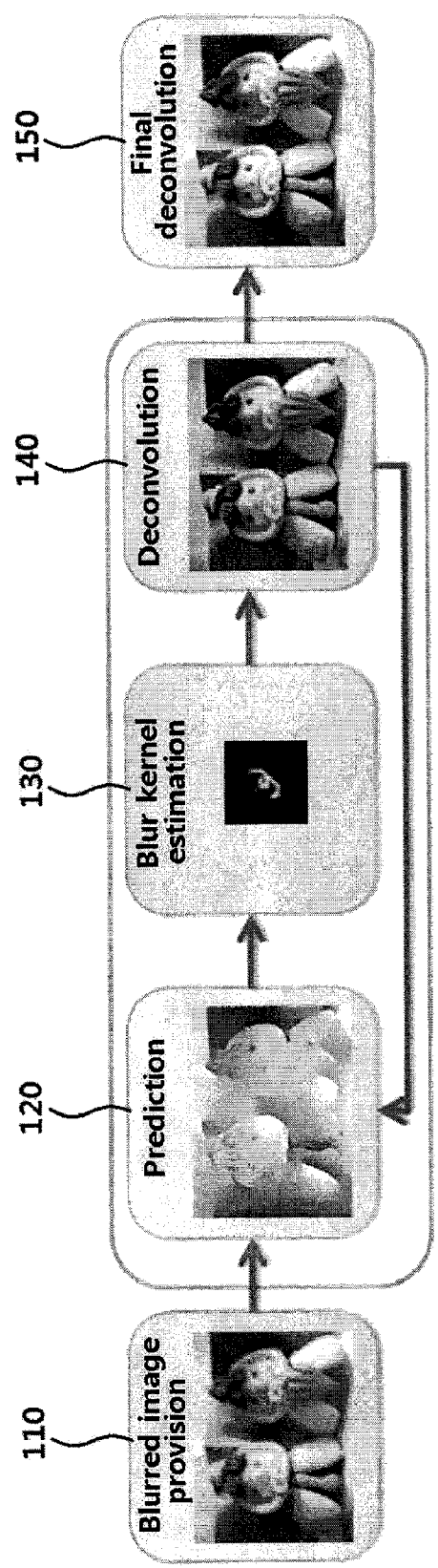
FIG. 1 is a flowchart of a method of deblurring an image according to an exemplary embodiment of the present invention.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms used therein including technical or scientific terms have meanings understood by those skilled in the art. Terms generally defined in dictionaries should be construed as having a meaning on a context of related schemes, and not as having an abnormally or inordinately formal meaning, unless clearly defined.

Hereinafter, preferred exemplary embodiments of the present invention will be described in greater detail with reference to the accompanying drawings.

In general, motion blur may be represented using Equation 1:

$$B = K*L + N \quad \text{Equation 1}$$

where B denotes a blurred image, K denotes a motion blur kernel or a point spread function (PSF) indicating blur information for an image, and L denotes a latent image, i.e., a strong non-blurred image. Also, N denotes an unknown noise introduced in an image acquisition process, and * denotes a convolution operator.

For blind deconvolution of Equation 1, L and K must be optimized in an iteration process. Also, the latent image and the blur kernel can be estimated using Equations 2 and 3:

$$L' = \operatorname{argmin}_L \{\|B - K*L\| + \rho_L(L)\} \quad \text{Equation 2}$$

$$K' = \operatorname{argmin}_K \{\|B - K*L\| + \rho_K(L)\} \quad \text{Equation 3}$$

where $\|B-K*L\|$ denotes a data fitting term, and $\rho_L$ and $\rho_K$ denote regularization terms.

Iterative optimization is intended to gradually refine the accuracy of the blur kernel K. A final deblurred image is obtained by performing a deconvolution operation on the final blur kernel K and the given blurred image B. A latent image estimated during the iterative optimization does not have a direct influence on the final deblurred image but on refinement of the motion blur kernel K, such that the latent image has an indirect influence on the final deblurred image.

The iterative optimization process for latent image estimation enables sharp edges to be restored from the latent image and a noise reduction characteristic to be obtained in a smooth region, which is used to estimate a more accurate motion blur kernel. Even when it is assumed that a given image includes constant blur, the more accurate motion blur kernel can be acquired around sharp edges. For example, the motion blur kernel cannot be estimated in a region having constant intensity, but since a natural image generally includes sharp edges, the motion blur kernel may be effectively predicted through the edges restored in the latent image estimation process.

In a general natural image, a smooth region occupies a larger space than a sharp edge region, such that suppression of noises in the smooth region is critical. Noises not suppressed in the smooth region may greatly affect the data fitting term of Equation 3, which degrades the accuracy of estimation of the blur kernel from the sharp edges.

In a process of solving Equation 2, conventional methods for restoring sharp edges and suppressing noises use non-linear optimization with complex calculations. Also, a conventional method of estimating a blur kernel using Equation 3 requires operation of a great number of matrixes and vectors. As a result, the conventional method for iteratively performing blind deconvolution for estimation of a latent image and a blur kernel has a shortcoming of a great amount of calculation.

To overcome the shortcomings of the conventional methods as described above, the method of deblurring an image according to an exemplary embodiment of the present invention provides fast blind deconvolution by reducing a calculation amount in a process of estimating a latent image and a blur kernel.

In the method of deblurring an image according to an exemplary embodiment of the present invention, it is assumed that a latent image includes sufficient sharp edges to improve an estimation speed of the latent image, and sharp edges are restored using an image filter and a noise suppression characteristic is used instead of optimizing a non-linear regularization term having high calculation complexity in Equation 2.

Also, a blur kernel estimation process results in an improved speed of a numerical optimization process of Equation 3 by excluding a pixel value.

In the method of deblurring an image according to an exemplary embodiment of the present invention, the latent image estimation process includes two steps: simple deconvolution and prediction.

In the simple deconvolution step, given a blurred image B and a blur kernel K, blur is first eliminated using simple and fast deconvolution having Gaussian prior in order to estimate the latent image L. The latent image L includes noises in smooth edges and a smooth region due to characteristics of the Gaussian prior.

In a step of predicting the latent image L, sharp edges are restored and noises are eliminated using an image filter to obtain an estimated latent image L' with refined accuracy. Here, the sharp edges and the suppressed noises in the smooth region of the latent image are used as critical characteristics when the latent image is used to estimate the blur kernel, such that the estimated latent image L' can provide a high-quality latent image for accurate estimation of the blur kernel even if the simple deconvolution degrades the quality of the image.

The blur kernel estimation step uses a conjugate gradient (CG) to solve Equation 3. Also, gradient calculation for an energy function is performed several times in solving Equation 3.

Since the gradient calculation involves a large matrix and vector multiplication, it is very complex. A calculation speed of multiplication associated with the convolution operation can be improved by using a fast Fourier transform.

However, it is necessary to properly adjust an image boundary that obstructs direct concatenation of the fast Fourier transform in sequentially performing the fast Fourier transform.

A number of image boundary adjustments and fast Fourier transforms can be greatly reduced by formulating Equation 3 to obtain an energy function having only image derivatives. Also, the energy function improves a processing speed of the conjugate gradient (CG), provides a well condition having a small condition number to a calculation system derived from Equation 3, and improves a convergence speed.

FIG. 1 is a flowchart of a method of deblurring an image according to an exemplary embodiment of the present invention.

Referring to FIG. 1, a blurred image is first provided (step 110).

A prediction step 120 is located at an initial stage of an iterative loop to provide an initial value of a latent image L for estimation of a blur kernel when the blurred image is provided.

In the prediction step, a gradient map $\{Px, Py\}$ is calculated in x and y directions of the latent image L to predict prominent edges from the latent image in which noises are suppressed in the smooth region.

In iterations of steps 120 to 150, the estimated latent image L acquired by the deconvolution step in the previous iteration is input to the prediction step although it is not an initial input.

The blur kernel estimation step 130 estimates the blur kernel K using the gradient map $\{Px, Py\}$ predicted through the calculation in step 120 and the blurred image B.

In a deconvolution step 140, the blur kernel K and the blurred image B are used to estimate the latent image L. Here, the estimated latent image L is input to the prediction step 120 in a next iteration.

In the method of deblurring an image according to an exemplary embodiment of the present invention, steps 120 and 130 are iteratively performed to estimate the blur kernel K and the latent image L more effectively, thereby improving the accuracy of the estimation.

In the method of deblurring an image according to an exemplary embodiment of the present invention, grayscale versions of the blurred image B and the latent image L are used in the iteration process for updating the accuracy of the blur kernel K and the latent image L.

After the final blur kernel K is obtained through the iterations, final deconvolution is performed on the final blur kernel K and each color channel of the blurred image B to obtain a final deblurred image (step 150).

Figure 2:
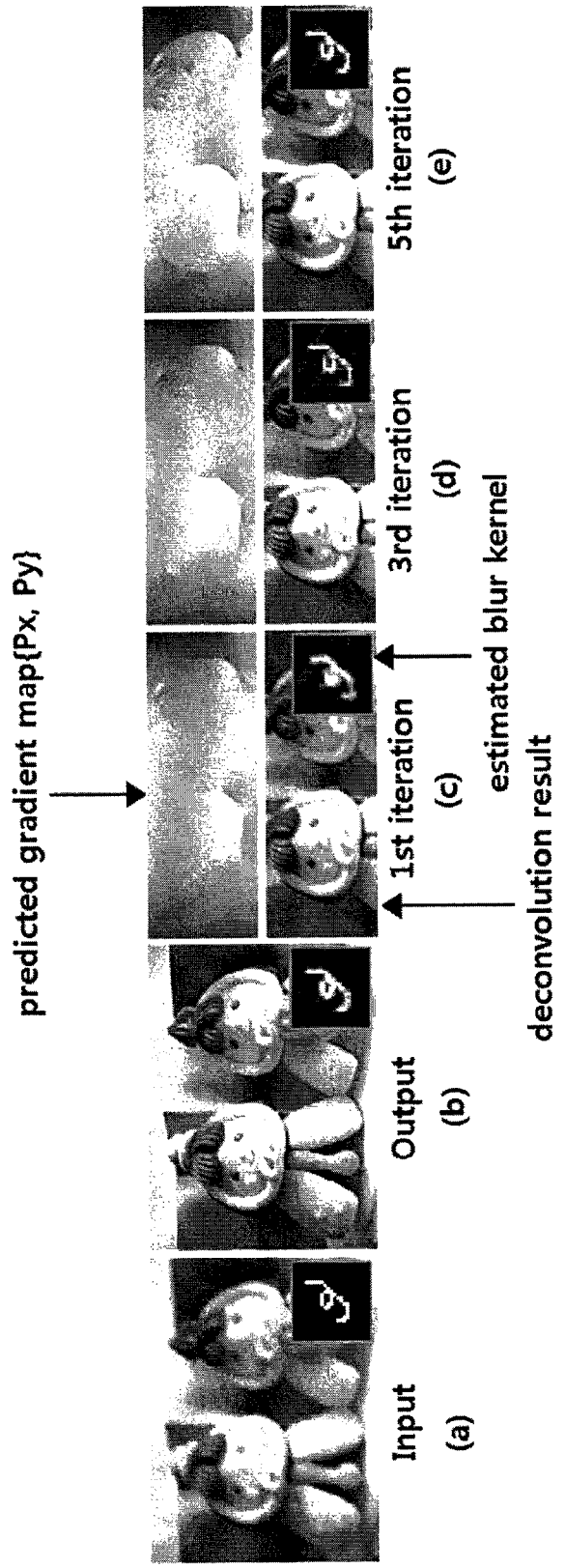
FIG. 2 illustrates a deblurred image according to a number of iterations in a method of deblurring an image according to an exemplary embodiment of the present invention in FIG. 1.

FIG. 2 illustrates a deblurred image according to a number of the iterations in the method of deblurring an image according to an exemplary embodiment of the present invention shown in FIG. 1.

FIG. 2(a) illustrates an original blurred image, and FIG. 2(b) illustrates a final deblurred image according to an exemplary embodiment of the present invention.

FIGS. 2(c) to 2(e) illustrate results of iteratively performing steps 120 to 140 in FIG. 1 once, three times, and five times, respectively, i.e., deconvolution results including a predicted gradient map $\{Px, Py\}$ and an estimated blur kernel. In FIG. 2, Poisson reconstruction was used for visualization in the predicted gradient map $\{Px, Py\}$.

As shown in FIG. 2, in the method of deblurring an image according to an exemplary embodiment of the present invention, as a number of the iterations of steps 120 to 140 in FIG. 1 increases (the 5th iteration in FIG. 2(e)), the latent image can be estimated more accurately and a more accurate blur kernel can be predicted based on the estimated latent image. The more accurately estimated blur kernel may be used to obtain a final deblurred image (b).

A method of deblurring an image according to an exemplary embodiment of the present invention will now be described in greater detail.

First, in the prediction step 120 in FIG. 1, the image gradient map $\{Px, Py\}$ is estimated by leaving only prominent edges in the latent image L and setting a gradient for other regions to 0. Convolution of gradient 0 is always zero irrespective of the estimated blur kernel, such that only prominent edges affect the blur kernel optimization in the blur kernel estimation step 130.

The prediction step uses a shock filter to restore strong edges. The shock filter is an efficient tool for strengthening features of an image by restoring sharp edges from the blurred image.

The shock filter may be represented using Equation 4:

$$I_{t+1} = I_t - \text{sign}(\Delta I_t)\|\nabla I_t\|dt \qquad \text{Equation 4}$$

where $I_t$ denotes an image at a time t, and $\Delta I_t$ and $\nabla I_t$ denote the Laplacian and gradient of $I_t$, respectively. Also, dt denotes a time step for single evolution.

Figure 3:
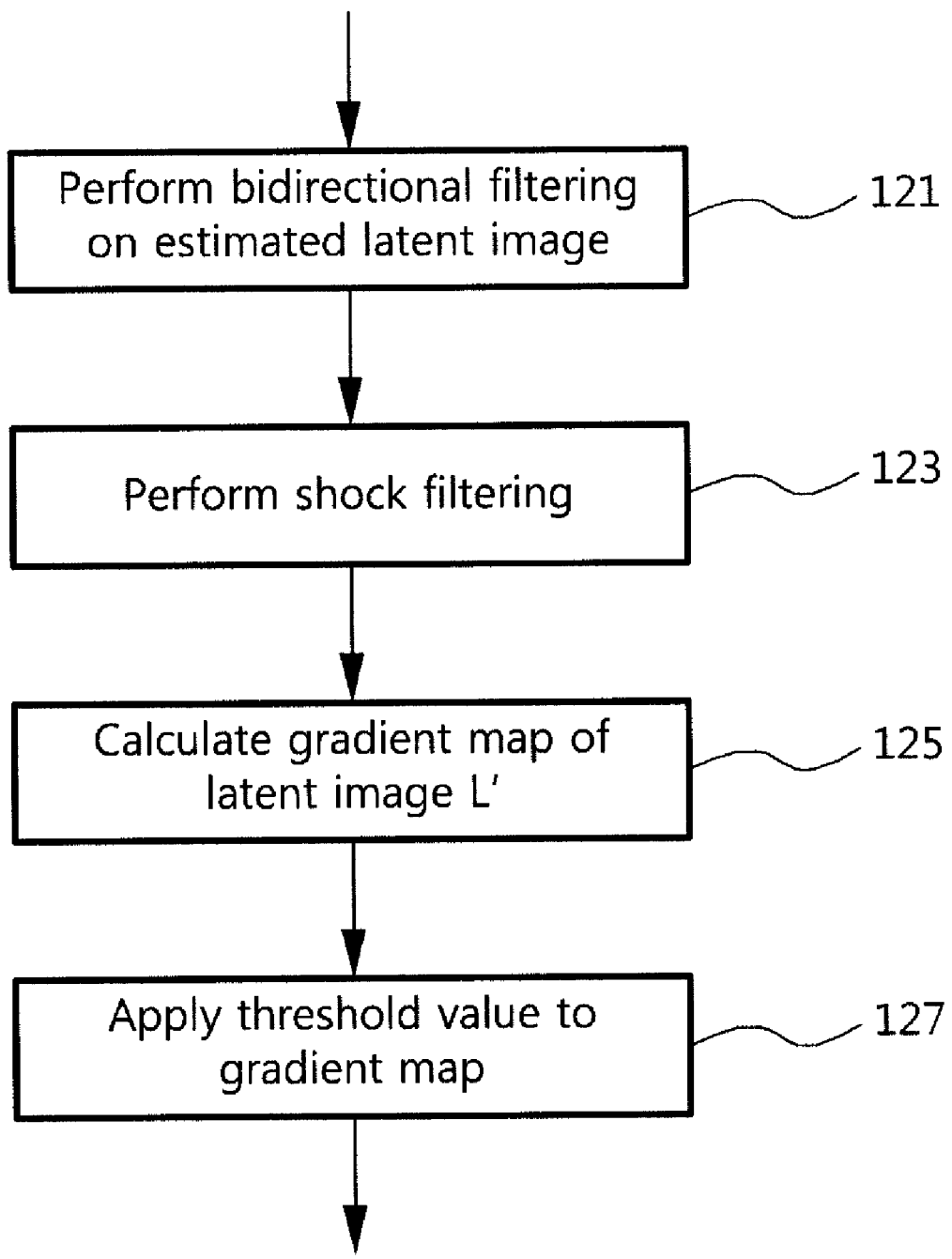
FIG. 3 is a flowchart of a prediction step in FIG. 1.

FIG. 3 is a flowchart of the prediction step in FIG. 1.

Referring to FIG. 3, the prediction step may include applying bidirectional filtering, applying shock filtering, and applying a gradient threshold value.

First, bidirectional filtering is applied to suppress noises and small details that may be present in the estimated current latent image L (step 121). Here, an image size capable of being supported in bidirectional filtering may be fixed to, e.g., 5×5.

Shock filtering is then applied to restore sharp edges in the estimated latent image L (step 123). In a latent image L' that is a shock-filtered resultant image, contrast of edges is improved but noises are increased.

In order to eliminate the noises, a gradient map $\{\partial_x L', \partial_y L'\}$ of the latent image L' is calculated (step 125) and a threshold value is applied to the calculated gradient map to truncate the gradient (step 127). The truncated gradient map $\{P_x, P_y\}$ becomes a final output of the prediction step. Here, the gradient may be truncated, for example, by setting a gradient smaller than the threshold value to 0.

The threshold value for truncating the gradient is obtained by dividing a direction of the gradient into intervals of a predetermined-angle (e.g., 45°), creating a histogram according to a gradient size for each direction (where, angles between 180° and 360° are regarded as those in directions in which only signs are different and sizes equals), and setting a size of a gradient that can include as many pixels as a predetermined multiple (e.g., double) or more of a maximum value of vertical and horizontal sizes of the blur kernel for each direction, as the threshold value.

In a deconvolution step 140, the latent image L is estimated based on a given blur kernel K and a provided blurred image B. Here, the latent image L is estimated using an energy function. The energy function may be represented using Equation 5:

$$f_L(L) = \sum_{\partial_*} \omega_* \|K * \partial_* L - \partial_* B\|^2 + \alpha \|\nabla L\|^2 \qquad \text{Equation 5}$$

where $\partial_* \in \{\partial_\alpha, \partial_x, \partial_y, \partial_{xx}, \partial_{xy}, \partial_{yy}\}$ denotes a partial differentiation operator and an order in different directions, $\omega_* \in \{\omega_0, \omega_1, \omega_2\}$ denotes a weight for each partial differentiation, and $\alpha$ denotes a weight (e.g., 0 or 1) for a regularization term.

The first term of Equation 5 is based on the blur model using image derivatives proposed by Shan et al. (SHAN, Q., JIA, J., and AGARWALA, A., 2008, High-quality Motion Deblurring From A Single Image. ACM Trans. Graphics 27, 73.) in order to reduce ringing artifacts. Also, a regularization term $\|\nabla L\|^2$ takes a latent image L having a smooth gradient.

Equation 5 may be optimized very quickly through pixel-wise division in a frequency domain using only two fast Fourier transforms. An optimization result of Equation 5 may include smooth edges and ringing artifacts. However, since only sharp edges are restored and other portions including ringing artifacts are truncated in step 120, a result of performing single deconvolution based on the prediction step 120 does not affect accurate blur kernel estimation.

In the method of deblurring an image according to an exemplary embodiment of the present invention, a multi-scale iterative process is performed to effectively deblur a large blurred image.

Figure 4:
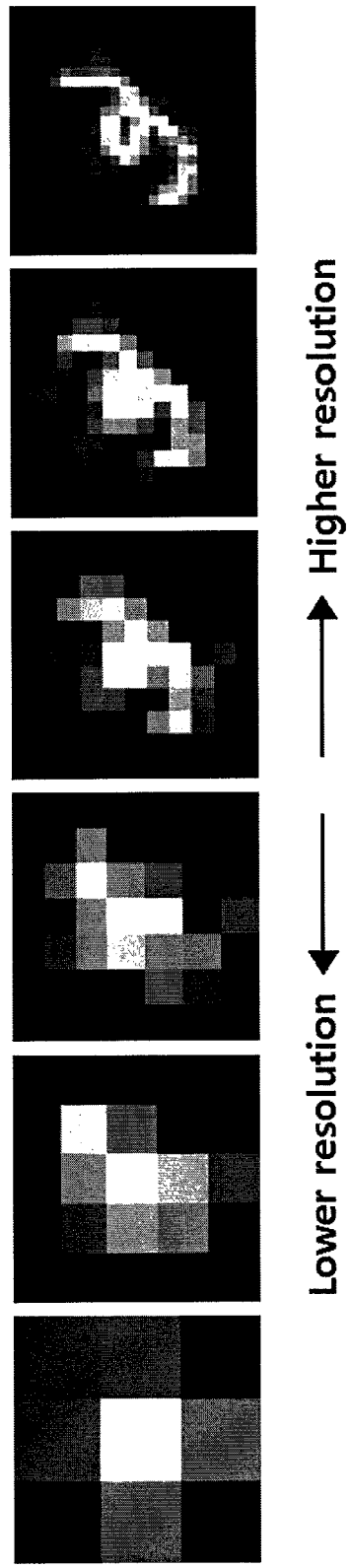
FIG. 4 illustrates kernels estimated in different scales in the method of deblurring an image according to an exemplary embodiment of the present invention.

FIG. 4 illustrates kernels estimated in different scales in the method of deblurring an image according to an exemplary embodiment of the present invention.

The multi-scale iterative process will be described with reference to FIG. 4. First, sharp edges are estimated in lower resolution in which a range of blur is narrow and the edges can be estimated without severe localization errors.

In higher resolution, sharp edge estimation begins while avoiding the severe localization errors from a deconvoluted image acquired through the previous lower resolution.

The estimation of the sharp edges during the iterative process in a specific scale is applied to a deconvolution result obtained through the blur kernel updated in a previous iterative process.

In the method of deblurring an image according to an exemplary embodiment of the present invention, a blur kernel for large blur may be estimated using small bidirectional and shock filters through the multi-scale iterative process, as described above.

The multi-scale iterative process enables estimation of large blur that has not been handled using one scale. Also, in the method of deblurring an image according to an exemplary embodiment of the present invention, two fast Fourier transforms and simple image filtering are performed in predicting the gradient map of the latent image for blur kernel estimation, and bidirectional filtering, shock filtering and gradient threshold value application may be performed very quickly. The method is performed faster than conventional deblurring methods (e.g., the method proposed by Shan et al., 2008) that perform 30 to 60 fast Fourier transforms.

The blur kernel estimation using the estimated gradient map {Px, Py} uses the energy function in Equation 6:

$$f_K(K) = \sum_{(P_*, B_*)} \omega_* \|K * P_* - B_*\|^2 + \beta \|K\|^2, \qquad \text{Equation 6}$$

where $\omega_* \in \{\omega_1, \omega_2\}$ denotes a weight for each partial differentiation, and $P_*$ and $B_*$ may vary with Equation 7:

$$(P_*, B_*) \in \{(P_x, \partial_x B), (P_y, \partial_y B), (\partial_x P_x, \partial_{xx} B), (\partial_y P_y, \partial_{yy} B),$$
$$((\partial_x P_y + \partial_y P_x)/2, \partial_{xy} B)\}. \qquad \text{Equation 7}$$

In Equation 6, respective $(K * P_* - B_*)$ form a map I, which is defined as $\|I\|^2 = \Sigma_{(x,y)} I(x,y)^2$, where (x, y) denotes an index of a pixel in I. $\beta$ denotes a weight for Tikhonov regularization.

As shown in Equation 6, the present invention uses only image derivatives without including a pixel value in the energy function. The present invention uses a Tikhonov regularization term rather than L1 norm of K in the conventional deblurring method.

Equation 6 may be represented in a matrix form as shown in Equation 8:

$$f_k(k) = \|Ak - b\|^2 + \beta \|k\|^2 \qquad \text{Equation 8}$$
$$= (Ak - b)^T (Ak - b) + \beta k^T k$$

where A denotes a matrix consisting of five $P_*$, and k denotes a vector of the blur kernel K. b denotes a matrix consisting of five $B_*$.

Using a conjugate gradient (CG) to simplify Equation 8, a gradient of $f_k$ is defined as shown in Equation 9:

$$\frac{\partial f_k(k)}{\partial k} = 2A^T Ak + 2\beta k - 2A^T b, \quad \text{Equation 9}$$

where calculation of $\partial f_k(k)/\partial k$ requires much time due to a size of A. When the latent image L and the blur kernel K have respective sizes of n×n and m×m, the size of A becomes $5n^2 \times m^2$. Accordingly, direct calculation of Ak requires a very great amount of calculation and a large storage capacity. Even though $A^T A$ has a size of relatively small $m^2 \times m^2$, it still requires much calculation time.

However, since Ak corresponds to convolution between five $P_*$ and K, the calculation speed can be improved by using a fast Fourier transform. In particular, the Ak calculation requires six fast Fourier transforms, i.e., one $\mathcal{F}$ (K) and five $\mathcal{F}^{-1}[\omega_* \mathcal{F}(P_*) \circ \mathcal{F}(K)]$. Here, $\mathcal{F}$ and $\mathcal{F}^{-1}$ denote a forward FFT and an inverse FFT, respectively, and ○ denotes pixel-wise multiplication. $\mathcal{F}(P_*)$ may be calculated earlier than the conjugate gradient (CG).

A calculation speed of $A^T y$ (where y=Ak) can be improved through six fast Fourier transforms, similar to the above-described method.

As a result, in each iteration step of the conjugate gradient (CG) method a total of 12 fast Fourier transforms are performed for calculation of the gradient $\partial f_k(k)/\partial k$. A pre-processing step may calculate $A^T b$ as well as $\mathcal{F}(P_*)$ through a fast Fourier transform.

In the present invention, $A^T Ak$ directly calculated by associating Ak with $A^T y$ in order to further increase the calculation speed by reducing the number of fast Fourier transforms. $A^T Ak$ may be represented using Equation 10:

$$\mathcal{F}^{-1}\left[\sum_{P_*} \omega_* \overline{\mathcal{F}(P_*)} \cdot \mathcal{F}(P_*) \cdot \mathcal{F}(K)\right] \quad \text{Equation 10}$$

where $\overline{\mathcal{F}(P_*)}$ denotes a complex conjugate of $\mathcal{F}(P_*)$.

$$\sum_{P_*} \omega_* \overline{\mathcal{F}(P_*)} \cdot \mathcal{F}(P_*)$$

may be calculated in advance before the conjugate gradient (CG) method is iteratively performed. Accordingly, fast Fourier transforms are only performed twice for gradient calculation, such that a number of fast Fourier transforms can be reduced by 10 times.

Efficient calculation as described above results from the use of only the image derivatives without using the pixel value in Equation 6. That is, since the present invention uses only the image partial differentiation, the boundary of the image is extended to a region where a partial differentiation value is 0 prior to Ak calculation to avoid an image boundary issue.

After Equation 6 is optimized, values of elements smaller than 1/20 of a maximum value are set to 0 and other non-zero values are regularized so that a sum of the non-zero values can become 1.

The iteration number and the convergence speed for optimization convergence are very critical in the numerical optimization process. The method of estimating a blur kernel according to an exemplary embodiment of the present invention achieves a faster calculation optimization than the conventional method using pixel values.

Figure 5:
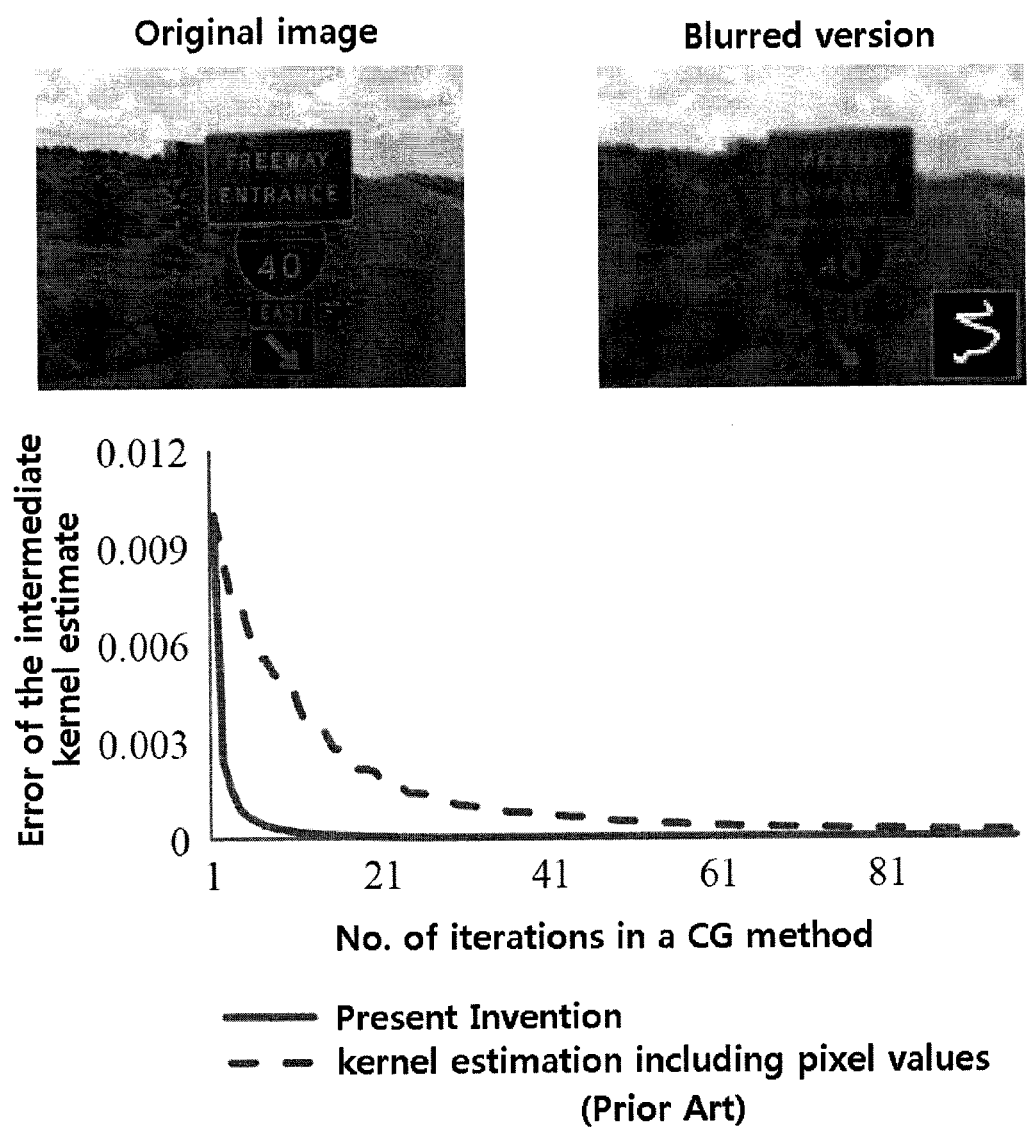
FIG. 5 illustrates a comparison in a convergence speed of blur kernel estimation between a method of estimating a blur kernel according to an exemplary embodiment of the present invention and a conventional method of estimating a blur kernel.

FIG. 5 illustrates a comparison in a convergence speed of blur kernel estimation between a method of estimating a blur kernel according to an exemplary embodiment of the present invention and a conventional method of estimating a blur kernel.

It can be seen from FIG. 5 that the method of estimating a blur kernel according to an exemplary embodiment of the present invention greatly reduces a blur kernel estimation error through iterations in a few times while the conventional method of estimating a blur kernel using pixel values relatively slowly reduces the blur kernel estimation error.

As described above, fast convergence in numerical optimization results from the well-defined condition of the matrix $A^T A$ in Equation 9. $A^T A$ may be represented using Equation 11:

$$A^T A = \sum_* \omega_* A_*^T A_* \quad \text{Equation 11}$$

where $A_*^T A_*$ is defined as $(A_*^T A_*)_{(i,j)} = (I_*^i)^T(*^j)$. Here, $I_*^i$ is a vector representation of $\partial_* L$ shifted by an amount dependent on i. Image partial differentiation is generally close to 0 except for edge pixels. Accordingly, $A_*^T A_*$ has a great element value in a diagonal region and a very small element value in an off-diagonal region.

For comparison of blur kernel estimation speeds, the methods of estimating a kernel are considered in a state where the energy function is the same as that proposed by "Shan et al., 2008" except that a Tikhonov regularization term is used in regularization terms for kernel estimation. Here, "Shan et al., 2008" using the Tikhonov regularization term is referred to as "Shan-L2".

An original version of "Shan et al., 2008" requires a greater amount of calculation because it uses the L1 norm in the regularization terms of the energy function. Also, in the original version of "Shan et al., 2008", a very large matrix is created in the kernel estimation step, which causes memory insufficiency and an inordinate calculation amount.

On the other hand, the blur kernel estimation according to an exemplary embodiment of the present invention performs a fast Fourier transform twice in performing each conjugate gradient (CG) method while "Shan-L2" performs a total of 14 fast Fourier transforms because it uses six images: one pixel value image and five partially differentiated images. Also, "Shan-L2" requires a greater number of iterations than the present invention because the former uses the pixel value.

It can be seen from FIG. 5 that in the method of estimating a blur kernel according to an exemplary embodiment of the present invention five conjugate gradient (CG) processes were iteratively performed while "Shan-L2" requires 30 iterations to obtain similar accuracy.

As a result, the method of estimating a blur kernel according to an exemplary embodiment of the present invention is 40 times faster than "Shan-L2" and 10 or more times faster than other conventional methods using pixel values.

Figure 6:
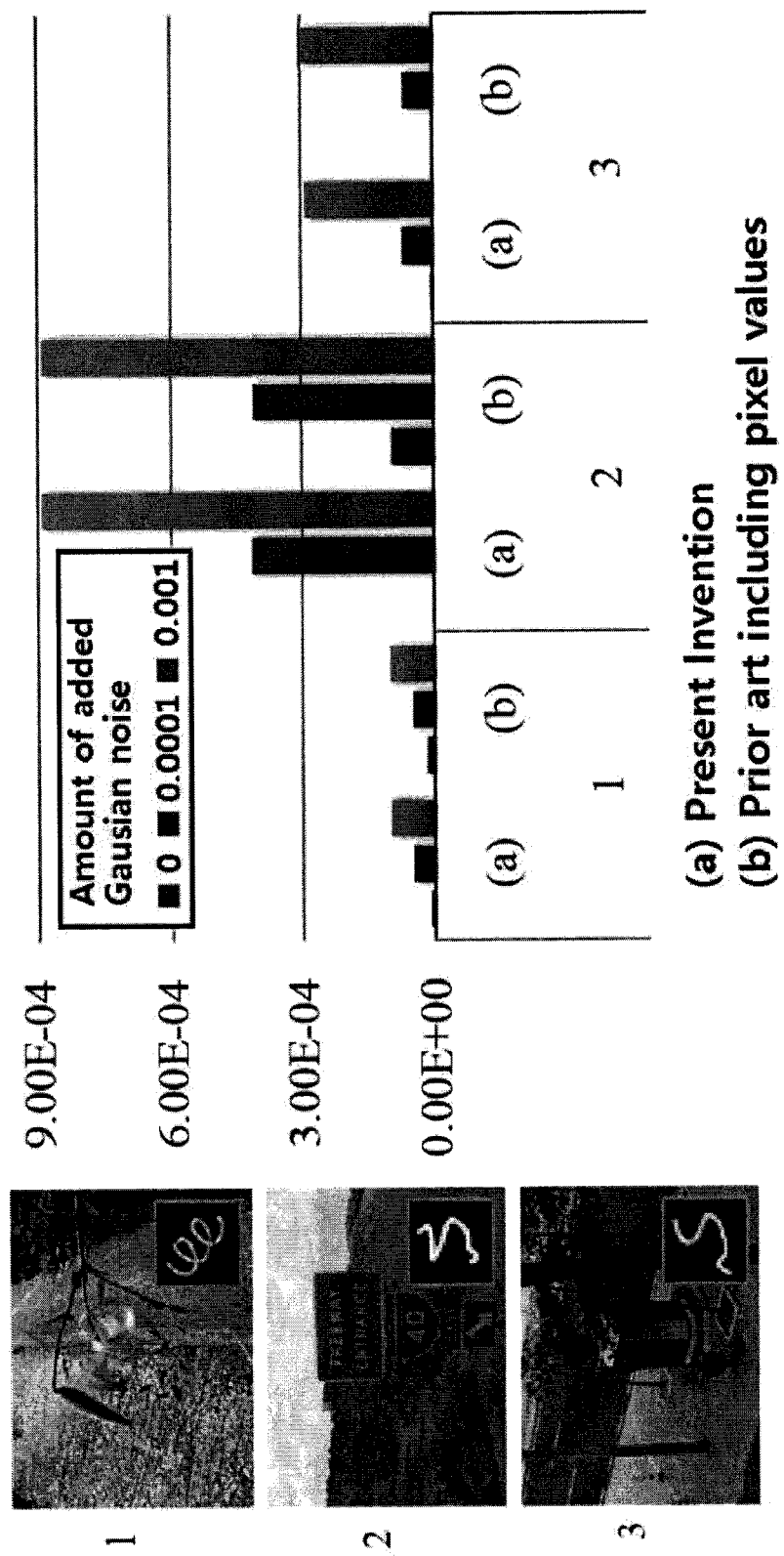
FIG. 6 illustrates the accuracy of blur kernel estimation according to an exemplary embodiment of the present invention.

FIG. 6 illustrates the accuracy of blur kernel estimation according to an exemplary embodiment of the present invention.

The present invention and a conventional method using pixel values were compared using a test image including different Gaussian noises to verify the accuracy of the method of estimating a kernel according to an exemplary embodiment of the present invention.

Referring to FIG. 6, the method of estimating a kernel according to an exemplary embodiment of the present invention has substantially the same accuracy as a conventional method of estimating a kernel using pixel values although the former does not use the pixel value. In some exemplary embodiments, the method of estimating a kernel according to the present invention has a higher accuracy than the conventional method of estimating a kernel using pixel values due to a well-defined calculation system obtained by excluding the pixel value.

Figure 7:
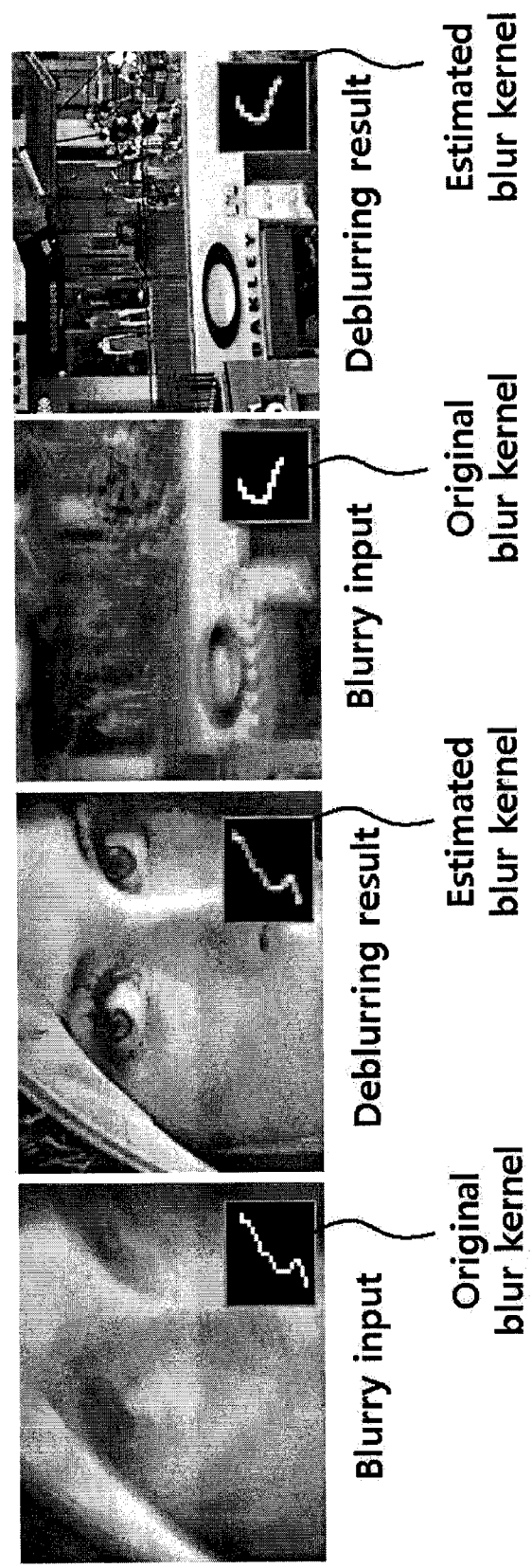
FIG. 7 illustrates images deblurred using a method of estimating blur of an image according to an exemplary embodiment of the present invention.

FIG. 7 illustrates images deblurred using a method of estimating blur of an image according to an exemplary embodiment of the present invention.

It can be seen from FIG. 7 that an estimated blur kernel is substantially the same as an original blur kernel and a deblurred image includes exactly restored details of the original image.

Figure 8:
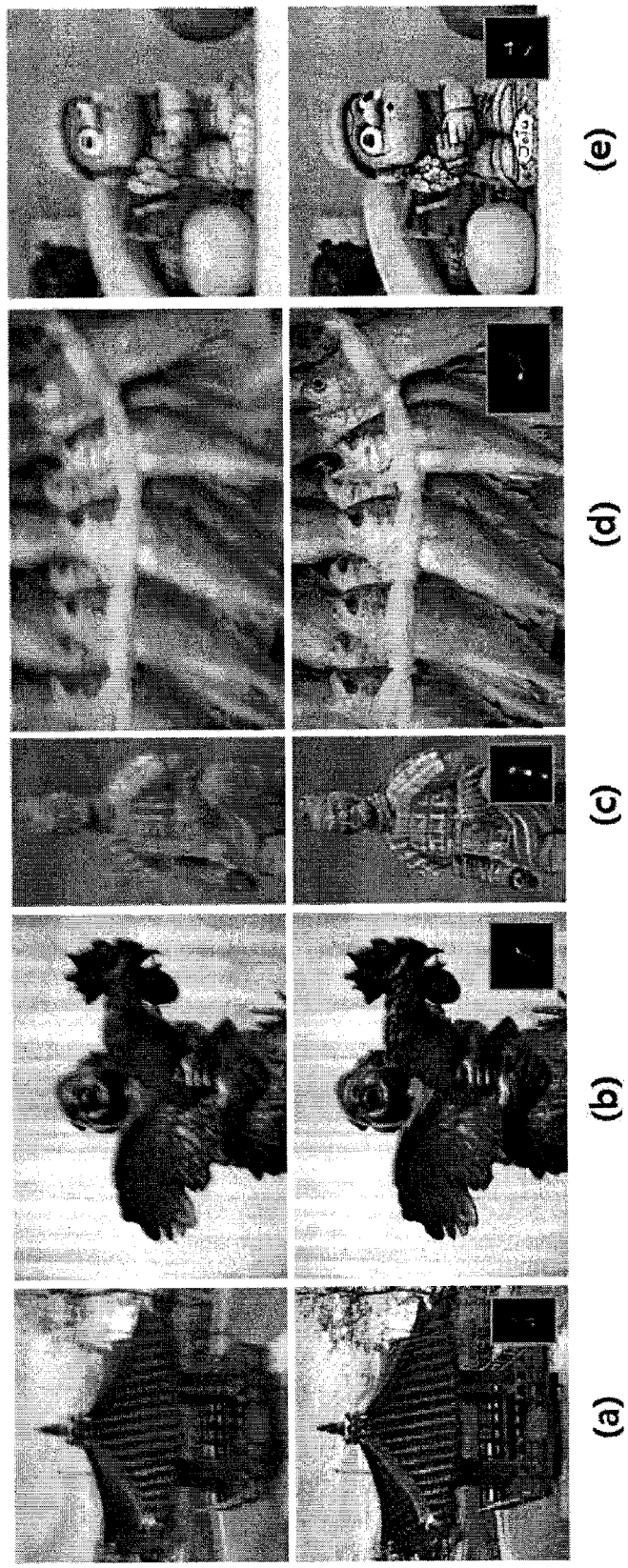
FIG. 8 illustrates actual images deblurred using a method of estimating blur of an image according to an exemplary embodiment of the present invention.

FIG. 8 illustrates actual images deblurred using a method of estimating blur of an image according to an exemplary embodiment of the present invention. Respective images shown in FIG. 8 include different complex structures and camera motions.

It can be seen from FIG. 8 that sharp edges of each deblurred image are considerably strengthened for a more prominent form and structure of an object.

FIG. 9 illustrates a processing time for deblurring images shown in FIG. 8.

For an experimental environment, a personal computer (PC) having an MS Windows XP (32 bits)-based Intel Core 2 CPU 2.66 GHz, 3.25 GB RAM, and an NVIDIA GeForce GTX graphic card was prepared. For the experiment, the deblurring method was embodied using a GPU acceleration function of the graphic card. It can be seen from FIG. 9 that even when a kernel is large, an input blurred image can be deblurred within a few seconds by the method of deblurring an image according to an exemplary embodiment of the present invention.

With the method of deblurring an image and the recording medium having the deblurring method recorded thereon, image filtering is applied to a received blurred image to restore edges and eliminate noises, a gradient map is predicted, the blur kernel is estimated based on the gradient map and the blurred image, and deconvolution is performed on the estimated blur kernel and the blurred image to estimate the latent image. The processes are iteratively performed to improve estimation accuracy for the blur kernel and then estimate a final blur kernel, and final deconvolution is performed on the final blur kernel and the blurred image to deblur the image. The blur kernel estimation process uses only image derivatives without using pixel values.

Thus, blur can be eliminated while maintaining the quality of the image with only one blurred image, and a deblurring time can be greatly reduced, compared with conventional deblurring methods.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of deblurring an image in a digital processing apparatus, the method comprising:

receiving a blurred image using the digital processing apparatus;

an image estimation step of estimating a non-blurred image, by a processor, from the blurred image;

a blur information estimation step of estimating blur information, by the processor, from the blurred image and the estimated non-blurred image; and a deblurring step of deblurring the blurred image, by the processor, based on the blurred image and the estimated blur information, wherein the image estimation step and the blur information estimation step are iteratively performed.

2. The method of claim 1, wherein the image estimation step comprises:

a gradient information prediction step of predicting gradient information for the blurred image; and a first deconvolution step of performing first deconvolution based on the estimated blur information and the blurred image.

3. The method of claim 2, wherein the gradient information prediction step comprises:

applying bidirectional filtering to the blurred image;

applying shock filtering to the bidirectional filtered image;

calculating a gradient map for the shock filtered image; and applying a threshold value to the calculated gradient map.

4. The method of claim 3, wherein applying the threshold value to the calculated gradient map comprises:

creating a histogram based on a direction and a size of the calculated gradient;

setting a size of a gradient capable of including as many pixels as a predetermined multiple or more of a maximum value of vertical and horizontal sizes of the blur information corresponding to each direction included in the created histogram, as a threshold value; and applying the set threshold value to the gradient map to truncate the gradient.

5. The method of claim 4, wherein applying the set threshold value to the gradient map to truncate the gradient comprises setting a gradient smaller than the threshold value to about zero.

6. The method of claim 4, wherein the blur information estimation step comprises estimating the blur information based on the blurred image and the truncated gradient.

7. The method of claim 4, wherein the blur information estimation step comprises estimating the blur information using an energy function including only image derivatives without a pixel value.

8. The method of claim 1, wherein the image estimation step and the blur information estimation step are iteratively performed while changing resolutions of the blurred image and the estimated non-blurred image.

9. A recording medium having a program of instructions recorded thereon, wherein the program is tangibly embodied and is readable and executable by a digital processing apparatus for deblurring a blurred image, the program performing:

receiving a blurred image;

an image estimation step of estimating a non-blurred image from the blurred image;

a blur information estimation step of estimating blur information from the blurred image and the estimated non-blurred image; and a deblurring step of deblurring the blurred image based on the blurred image and the estimated blur information, wherein the image estimation step and the blur information estimation step are iteratively performed.

* * * * *